United States Patent
Brassier et al.

[11] Patent Number: 5,436,809
[45] Date of Patent: Jul. 25, 1995

[54] INDICATING LIGHT UNIT HAVING MODULAR LUMINOUS ELEMENTS, FOR A MOTOR VEHICLE

[75] Inventors: Marc Brassier, Vincennes; Jean-Claude Gasquet, Saint-Clement; Daniel Segaud, Paris; Bernard Mauroy, Roissy en Brie, all of France

[73] Assignee: Valeo Vision, Bobigny Cedex, France

[21] Appl. No.: 144,831

[22] Filed: Oct. 29, 1993

[30] Foreign Application Priority Data

Nov. 2, 1992 [FR] France ................. 92 13089

[51] Int. Cl.6 ............................. B60Q 1/26
[52] U.S. Cl. ...................... 362/61; 362/249; 362/800
[58] Field of Search ............ 362/61, 83.3, 237, 240, 362/249, 252, 800

[56] References Cited

U.S. PATENT DOCUMENTS

| | | | |
|---|---|---|---|
| 4,271,408 | 6/1981 | Teshima et al. | |
| 4,570,207 | 2/1986 | Takahashi et al. | 362/800 |
| 4,733,335 | 3/1988 | Serizawa et al. | 362/800 |
| 4,868,719 | 9/1989 | Kouchi et al. | |
| 4,959,761 | 9/1990 | Critelli et al. | |
| 4,963,933 | 10/1990 | Brownlee | 362/800 |
| 5,008,788 | 4/1991 | Palinkas | 362/800 |
| 5,038,255 | 8/1991 | Nishihashi et al. | |
| 5,062,027 | 10/1991 | Machida et al. | 362/800 |
| 5,174,649 | 12/1992 | Alston | 362/800 |
| 5,241,457 | 8/1993 | Sasajima et al. | 362/800 |
| 5,337,225 | 8/1994 | Brookman | 362/800 |

FOREIGN PATENT DOCUMENTS

| | | |
|---|---|---|
| 0326668 | 8/1989 | European Pat. Off. . |
| 0328088 | 8/1989 | European Pat. Off. . |
| 0434471 | 6/1991 | European Pat. Off. . |
| 2941634 | 4/1980 | Germany . |
| 61-119444 | 6/1986 | Japan . |
| WO84/00799 | 3/1984 | WIPO . |

OTHER PUBLICATIONS

Patent Abstracts of Japan, vol. 10, No. 307 (M-527) (2363) Oct. 18, 1986.

*Primary Examiner*—Richard R. Cole
*Attorney, Agent, or Firm*—Morgan & Finnegan

[57] ABSTRACT

An indicating light unit for a motor vehicle has a support plate, an optic extending along the support plate, and a plurality of elementary luminous modules each comprising a light emitting diode. Each module comprises at least one light emitting diode mounted on a frame and covered with a cover element, the modules being juxtaposed to each other in predetermined positions on the support plate and being connected electrically to a common electrical supply source. The unit is of low thickness and gives a homogeneous light field.

21 Claims, 7 Drawing Sheets

FIG_1

FIG_2

FIG.3a  FIG 3

FIG_4

FIG_5

FIG_6

FIG_15

FIG_16a

FIG_16b

FIG_16c

FIG_17

INDICATING LIGHT UNIT HAVING MODULAR LUMINOUS ELEMENTS, FOR A MOTOR VEHICLE

FIELD OF THE INVENTION

The present invention relates in general terms to indicator lights, or light units, for motor vehicles.

BACKGROUND OF THE INVENTION

An indicator light conventionally comprises a filament lamp mounted on a back plate which constitutes its base, together with an optic or cover glass in front of the lamp. Optical means are frequently used for directing a major proportion of the light emitted by the lamp into a direction which is close to a preferential emission axis, or else to confer a homogeneous light intensity on the lighting field of the indicator light in the event that a light source is used which is essentially a light source giving an intense light output.

It is also known to provide an indicator light which is subdivided into a plurality of elements, each of which includes a small filament lamp, for example a lamp of the wedge base type, in cooperation with its own optical means, the object of this being to obtain a field of/-light which is both homogeneous and of large extent, while the light unit itself is of reduced thickness. Such a light, having a plurality of lamps, is however expensive to make.

More generally, the various components of an indicator light, with the exception of the lamp or lamps (which are generally standard) must be subjected to scrutiny and specific development (in every case, in accordance with a given specification). This results in a relatively high selling price.

Other disadvantages of conventional indicating lights or light units lie in the fact that the filament lamps which are used have to be replaced quite frequently, and they generally occupy a substantial depth, due to the fact that the base on which they are fitted must present (at least with some lamps) a parabolic profile for light flux concentration. Yet another disadvantage is that it is impossible to produce fields of light with complex contours. In connection with this last point, the designer generally has to work with simple circular or rectangular shapes only.

The present invention aims to overcome the above mentioned drawbacks by providing an indicating light unit which can be made easily and inexpensively, with a light field having geometric and photometric characteristics which can be very freely determined, with the additional advantages that the thickness of the indicating light unit is extremely small, while the unit is highly reliable, all due to its modular design.

According to the invention, an indicating light unit for a motor vehicle is characterised in that it includes:
 a support plate;
 an optic extending along the said plate;
 a plurality of elementary luminous modules each of which comprises a plurality of light emitting diodes mounted on a frame and covered by a cover element, with each said module incorporating electrical connection means for interconnecting the various light emitting diodes;
 fastening means for fastening the said modules in juxtaposed relationship with each other in predetermined positions on the said plate; and
 means for the electrical connection of the luminous modules to a common electrical supply source.

Further features, objects and advantages of the present invention will appear more clearly on a reading of the detailed description of preferred embodiments of the invention which follows, this description being given by way of example only and with reference to the accompanying drawings.

DESCRIPTION OF PREFERRED EMBODIMENTS OF THE INVENTION

At the outset, it will be noted that, as between one Figure of the drawings and another, those elements or portions which are identical or similar to each other are designated by the same reference numerals and/or letters, and will not be described each time, in the interests of keeping the description as concise as possible.

Reference will first be made to FIGS. 1 to 5, which show a module of light emitting diodes designed to serve as an elementary component and adapted to be juxtaposed with identical modules so as to form an indicating light unit comprising a single light or a group or cluster of indicating lights, having a large surface area.

In the present example, such a module, which is indicated generally at 100, consists of four light emitting diodes 110 of the "Brewster" type which is available commercially. One advantage associated with the use of Brewster diodes in groups of four lies in the fact that each diode calls for an electrical supply voltage of the order of 2.5 to 3 volts, so that by connecting the diodes in series, the potential of 12 volts which is available across the terminals of the battery of the vehicle can be applied directly to the module.

Figure 2:
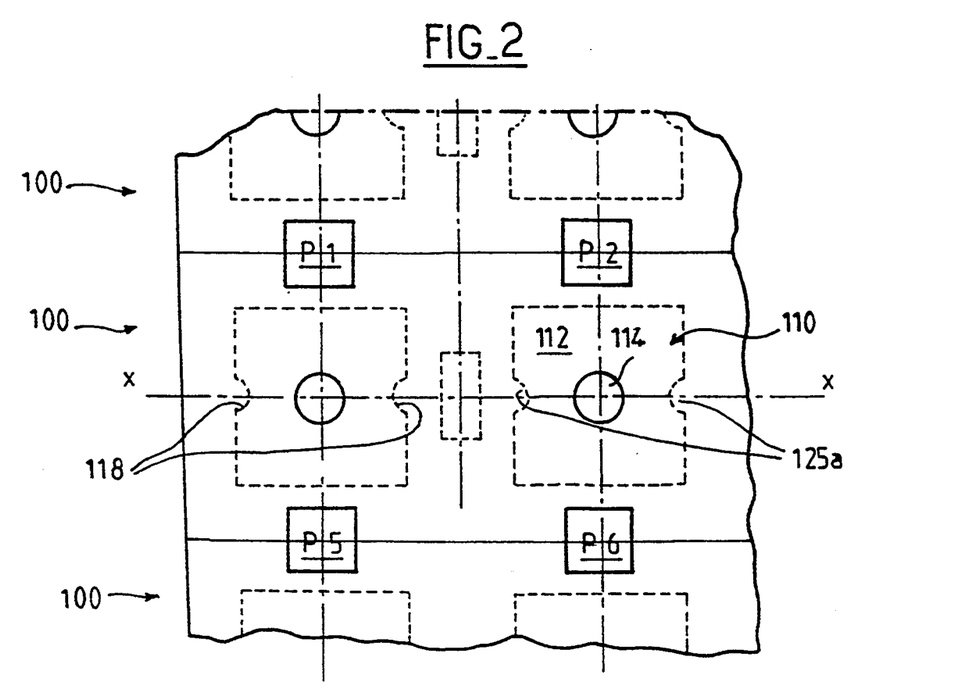
FIG. 2 is a partial top plan view of an array of modules as in FIG. 1.

Each light emitting diode (or LED) 110 comprises a body 112 of generally square shape, with a trapezoidal transverse cross section, this design being conventional. At the centre of the outer surface or front surface of the body, there is a projection 114, the shape of which is substantially hemispherical. Three metal tags 116 for electrical connection extend from the back of the body 112, with each of these tags having a terminal portion of reduced cross section. As can be seen in FIG. 2, the body 112 of the LED 110 has two opposed lateral notches 118 of semicircular cross section, for locating the LED in a predetermined position.

Figure 4:
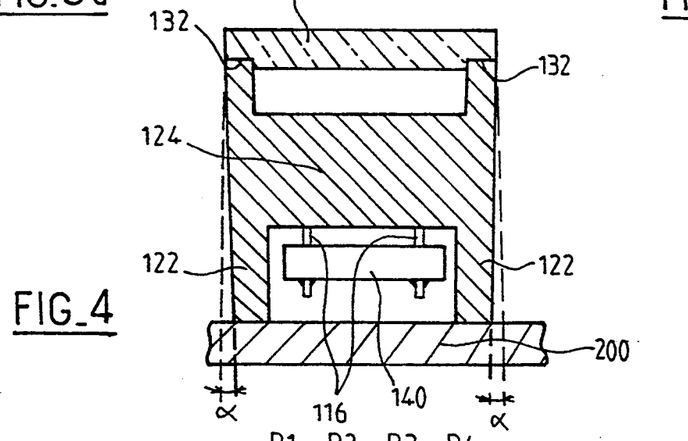
FIG. 4 is a view in transverse cross section taken on the line IV—IV in FIG. 1, showing the same module as the latter.

A module in this first embodiment of the invention includes a frame 120 which is aligned on a longitudinal axis x—x (FIG. 2), and which has a right cross section which is generally in the shape of an H as seen in FIG. 4. The frame 120 includes two upright side portions 122, which are joined together by a transverse portion 124, essentially at mid-height. The frame 120 is preferably made by moulding in a suitable plastics material.

Figure 1:
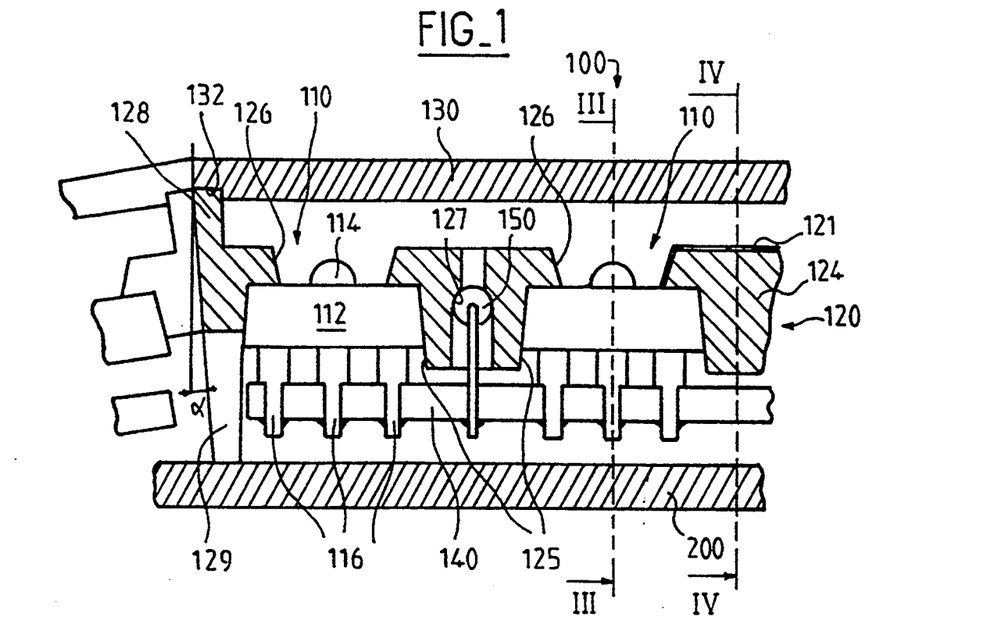
FIG. 1 is a view in median longitudinal cross section, showing a module of light emitting diodes in a first embodiment of the invention.

As is best seen in FIG. 1, four recesses 125, formed in the lower face of the transverse portion 124, are aligned on the axis x—x. The shape of these recesses 125 is substantially complementary to that of the bodies 112 of the four LED's 110. Thus each recess 125 has two lateral ribs 125a (FIG. 2) which are arranged to be engaged in the notches 118 in the LED body 112. In addition, in the upper face of each transverse portion 124, four transverse apertures 126 of generally circular cross section, in line with the recesses 125, are open into the centre of the latter. The apertures 126 are frusto conical, and are upwardly divergent as shown, in such a way that all of the slightly divergent light flux (having a typical solid angle of 50°) emitted by the associated LED 110, can pass through them.

The frame 120 also has two opposed terminal walls 128 (FIG. 1) which extend upwardly. At the upper end of the side branches 122 of the frame, there is secured a transparent element constituting a cover 130, which is preferably employed as an optical element. This element 130 is elongated along the axis x—x, over the whole length of the frame 120. Along its four edges, it has grooves 132 which are open at the side and which are arranged to receive the free ends of the branches 122 and of the terminal walls 128, thus ensuring proper mutual location of these elements. For example, the element 130 may include, in relief on either its internal surface or its external surface, four Fresnel lenses which are aligned with the light exit apertures 126 formed in the frame 120. Preferably, the components 110, 120 and 130 of the module are assembled by adhesive bonding, or by ultrasonic welding, although they may be assembled together in any other appropriate way in order to ensure perfect cohesion of the module 100.

The lower portion of the branches 122 (with reference to FIGS. 1, 3 and 4), and the transverse portion 124 together define a cavity which is arranged to receive a printed circuit 140 of elongated shape, on which the connecting tabs 116 of the LED's are soldered. It will be observed that in line with each terminal wall 128 of the frame, there is an aperture 129 (FIG. 1) which enables a printed circuit 140 to be connected electrically in parallel with a neighbouring printed circuit.

It is conventional that light emitting diodes connected in series require a current limiting resistor, again in series, to be interposed in the circuit. Such a resistor is indicated at 150. It is located in a complementary recess 127 which is formed in the transverse portion 124 of the frame between two adjacent recesses 125, and which is open at least downwardly. In this way the resistor 150 may be soldered directly on to the printed circuit 140 as indicated in FIG. 1.

As is shown in FIGS. 1 and 4, the frame 120 defines a rake angle α on its longitudinal edges and terminal edges. This angle may for example be 5°. As will be seen more clearly in detail below, this rake angle enables a set of LED modules to be juxtaposed intimately with each other, with mutual angular offsets which may in this case be 10°, which in turn enables the light unit to be given a curved profile.

A set off the modules 110 is arranged to be mounted on a support plate 200, using means which will be described below in one particular form.

Figure 5:
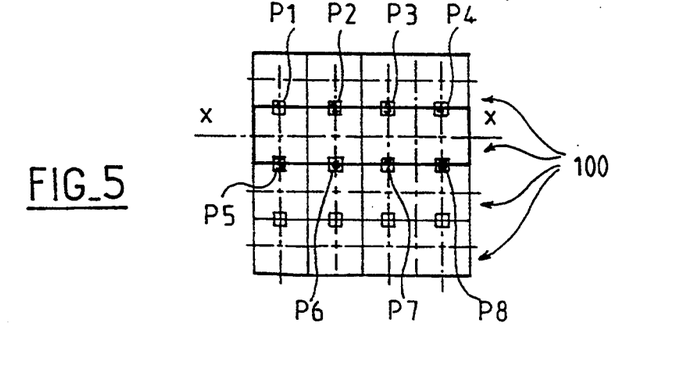
FIG. 5 is a diagrammatic top plan view showing four juxtaposed modules.

Referring to FIG. 5, eight locations are here defined on a module 100, these locations being denoted by the references P1 to P8 in FIG. 5 and lying respectively on either side of an LED element 110 in the transverse direction.

Figures 3, 3A:
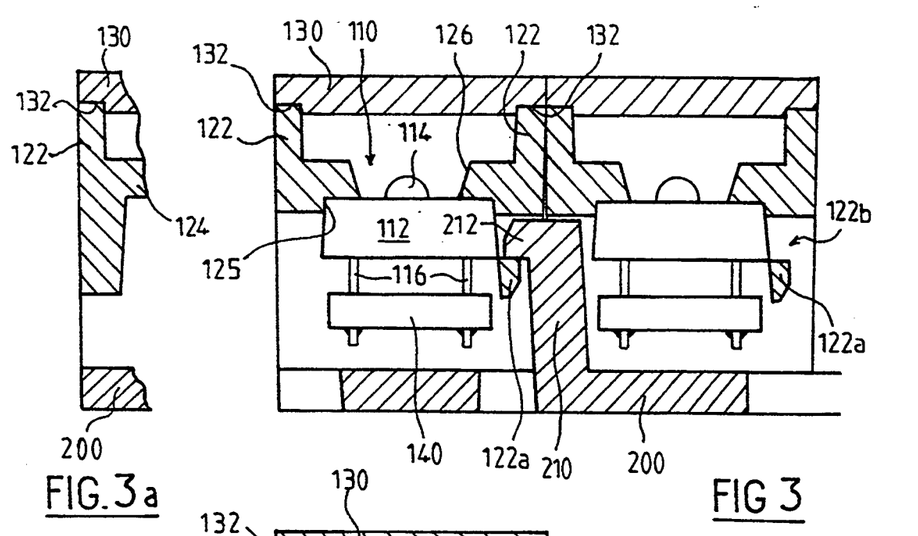
FIG. 3 is a view in transverse cross section taken on the line III—III in FIG. 1, showing the same module.
FIG. 3a is a view in partial transverse cross section, similar to FIG. 3 but showing a modification.

It is then arranged that at each location P1-P8 (or assembly zone), the frame 120 has one of three different configurations, namely:

a solid or obturated configuration, that is to say the side branch or wall 122 of the frame 120 is substantially uninterrupted in this position, this configuration being denoted "O" and illustrated in FIG. 3a;

a perforated or open configuration, that is to say the side wall 122 of the frame in this assembly zone is interrupted over a predetermined width, so as to leave an open passage extending between a height close to the top plane of the LED body 112 and the base of the frame; this configuration is denoted "T", and is shown in FIG. 3, in which each of the two juxtaposed modules 110 is provided with such a passage in a left hand position; and a latching configuration, in which the side wall 122 of the frame 120 is interrupted substantially in the same way as in the "T" configuration described above, but a latching tooth 122a defines a cavity 122b between itself and the upper end of the passage; this configuration is denoted "C" and is shown in FIG. 3 in which each of the two juxtaposed modules 100 has such a configuration in a position on the right hand side.

The support plate 200 is provided with flexible lugs 210 in particular places. These lugs 210 extend upwardly, and each lug 210 terminates in a latching tooth 212 which projects sideways. One such lug is shown in FIG. 3. The width of each lug 210 is chosen so as to be equal to, or slightly smaller than, the width of the passage which is defined by the side wall 122 of the frame 120 in the "T" and "C" configurations. Thus a frame 120 may have in its eight positions a pattern of eight assembly zones, the configurations of which are selected from among a larger number (which is equal in theory to 38) of possible patterns.

In addition, any one particular pattern of assembly configurations may constitute a code associated with the particular type of module of light emitting diodes under consideration. It is thus possible to code modules in accordance with the colour of the light which they emit (especially red or amber), or in accordance with the nature of the optical elements (i.e. prisms, ribs, lenses, Fresnel bars, and so on), which are formed on the transparent covering element 130 or the like. The main function of such a "coding" is to ensure clear identification during fitting of a plurality of modules 100 on to the support plate 200. This is important in particular so as to avoid the possibility of modules having different characteristics getting mixed up, and also to avoid orientating identical modules in head-to-toe relationship. It also makes in possible to avoid a situation in which a location on the support plate which is intended to receive one particular type of module can accidentally receive a module of a different type.

More precisely, it will easily be understood from FIGS. 3 and 3a that, during the side-by-side juxtaposition of two modules 700, a "C" configuration must be arranged facing a "T" configuration so that enough space can be left for the latching lug 210 of the support plate 200. Thus in the middle of FIG. 3 it can be seen that the lug 210, having its tooth 212 engaged in the cavity 122b of the left hand module, must follow a path passng through the passage defined by the "T" configuration of the right hand module. Modules placed side by side can thus readily be distinguished from each other in order to ensure that they are of the same type.

It will also be understood that a module cannot be positioned on the support plate if a latching lug 210 lies to the right (with reference to FIG. 3) of an "O" configuration. This produces a clear relationship between the module and the support plate, so as to ensure that the latter will always receive the correct type of module.

Figure 6:
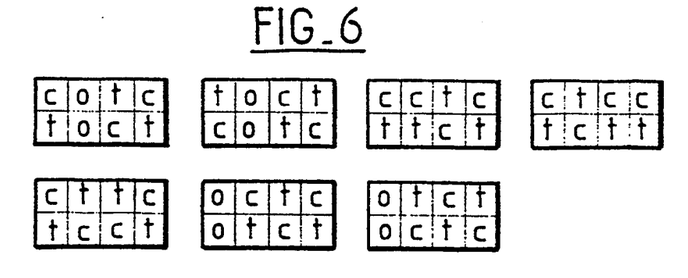
FIG. 6 shows in a diagrammatic form seven ways in which neighbouring modules can be assembled together.
Figure 7:
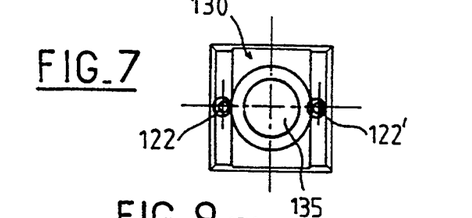
FIG. 7 is a bottom plan view of a second embodiment of a module of light emitting diodes in accordance with the invention.
Figure 8:
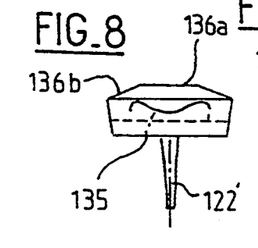
FIG. 8 is a view in elevation from one side, showing the same module as FIG. 7.
Figure 9:
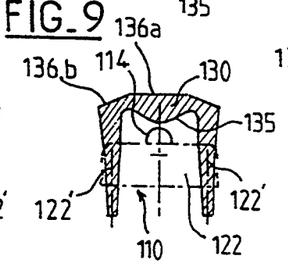
FIG. 9 is a view in median axial cross section showing the same module as FIGS. 7 and 8.
Figure 10:
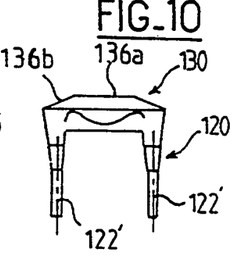
FIG. 10 is a view in front elevation of the same module as that shown in FIGS. 7 to 9.

Reference is now made to FIG. 6, which indicates (by the use of the above mentioned codes "C", "T" and "O") seven particularly appropriate configuration patterns. Each pattern comprises three latching, or C-type, assembly zones arranged in a triangle, which enables the modules to be anchored at three points on to the support plate, that is to say by means of three latching lugs 210, with each longitudinal edge including at least one of these "C" configurations. This gives the assembly a good degree of stability. In this way, seven different types of module can be identified.

Other patterns may of course be conceived, provided at least one latching configuration "C" is present on each longitudinal side, and provided also that an open configuration "T" is present in the position lying on the other side of the LED element 110 concerned.

Reference is here made once again to FIG. 1. It is of advantage that the outer surface of the transverse portion 124 facing towards the optical element 130 be covered with a coating 121 of the aluminised type (by application in the form of paint, vacumetallising, or the like), in such a way that when the module is extinguished and view from outside, it is thereby given as homogeneous an appearance as possible. In this connection, it will be noted that the body 110 of a Brewster diode commonly has an uncoloured, transparent or translucent appearance.

Although in the above description, the module includes four Brewster type diodes, it is of course possible to make modules which have any number of such diodes. It is also possible to design an assembly of elementary blocks, for example with one, two, four, eight and twelve diodes arranged in a single row; or having four, six or eight diodes arranged side by side in two rows, and so on. Such arrangements can be used to create fields of light (which may be curved), having shapes and dimensions which may be chosen at will by suitable selection of the elementary blocks.

Reference is now made to FIGS. 7 to 11, which show a module with a Brewster type diode in another embodiment of the invention. This module has a frame 120 and a cover element 130 which are integral with each other, and which are made by moulding in a suitable transparent plastics material. The frame 120 is in this case limited to two lugs 122', which project downwardly from median regions of the two opposed sides of the element 130, and which engage at least partially in opposed lateral slots 118 of the LED element 110, identical to that described above. This module, with its single Brewster diode (or, in a modification, more than one diode), may be fitted on to a printed circuit, not shown, with the connecting tags of the LED element 110 and the free ends of the lugs 122' being arranged to be engaged in appropriate holes formed in the printed circuit.

It will also be noted in FIGS. 7 to 11 that the element 130 defines a planar-convex lens, with its internal face 135 (facing towards the element 110) being convex, while the opposed portion 136a of its outer surface is flat, being bounded by a frusto conical chamfered portion 136b. This concentrates the light flux emitted by the LED along the axis of the LED element 110.

Figures 11, 12, 13, 14:
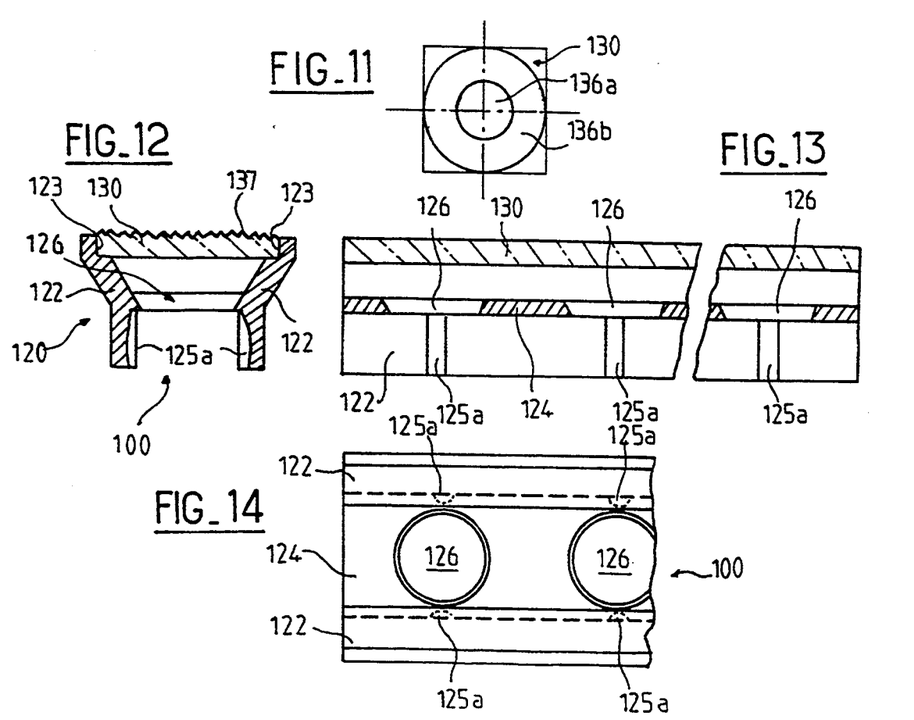
FIG. 11 is a top plan view of the same module as is seen in FIGS. 7 to 10.
FIG. 12 is a view in median transverse cross section showing a module of light emitting diodes in a third embodiment of the invention.
FIG. 13 is a partial view of the same module as in FIG. 12, shown in median longitudinal .cross section.
FIG. 14 is a partial top plan view of the same module as in FIGS. 12 and 13.

Referring now to FIGS. 12 to 14, these show a further embodiment of a module in accordance with the invention. In these Figures, the module has, in a similar way to the embodiment of FIGS. 1 to 6, an elongated frame 120, having a right cross section in the general form of an H, with two side branches 122 and a transverse portion 124, in which a plurality of aligned apertures 126 are formed, there being for example four of these apertures. However, by contrast with the embodiment in FIGS. 1 to 6, each LED element 122 is here received not in a specific recess formed in the transverse portion 124, but in the cavity which is defined by the base of the side branches 122 and by the transverse portion 124. In this connection, a semicircular rib 125a is provided in the base portion of the branches 122, in line with each respective aperture 126 and on either side of the latter. The rib 125a is arranged to engage in an associated notch 118 (FIG. 2) of the LED element 110.

Another particular feature of the module shown in FIGS. 12 to 14 lies in the fact that the cover element 130, which in this example is provided with Fresnel bars or ribs 137 on its outer surface, is set into the two branches 122 between which it extends, with grooves 123 being formed for this purpose in the outer end regions of the branches 122.

Finally it will be noticed that the branches 122 of the frame 120 are essentially parallel to each other in the vicinity of their base, but that they are divergent upwardly beyond the transverse portion 124. As before, this enables spreading light fields to be produced.

Again in this example, the components 110, 120 and 130 of the module are assembled together by a conventional adhesion or welding method. An advantage peculiar to this embodiment lies in that it is possible to produce a very long profiled element in which frames 120 of various lengths can be cut out so as to give modules with N elements 110.

Figure 15:
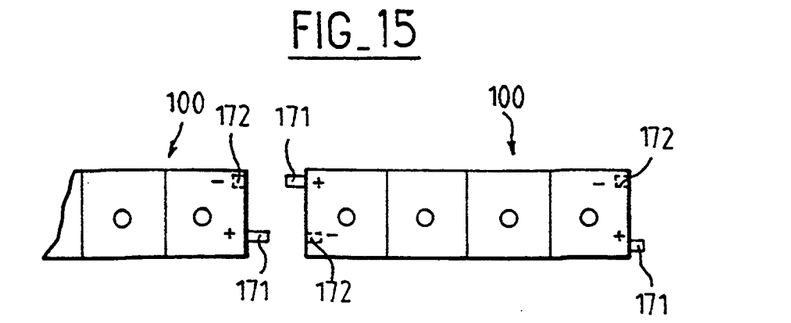
FIG. 15 shows diagrammatically the electrical connecting means whereby the modules of light emitting diodes are connected together.

Referring now to FIG. 15, this shows diagrammatically one possible arrangement for the electrical connection of two modules 100 disposed in alignment with each other. Each module 100 has, on each longitudinal end face, a male terminal element 171 and a female terminal element 172 which lie in accurately determined positions. At its opposite end, the module again has a male terminal element 171 and a female terminal element 172, arranged here in the opposite order. Thus, when a plurality of the modules are being aligned with each other, a male terminal 171 of one module engages in a female terminal 172, aligned with it, of the next adjacent module, while a male terminal 171 of this adjacent module engages in the female terminal 172 of the first module. Thus a bus-type electric supply circuit, extending through all of the modules connected together, is created.

Figure 16A:
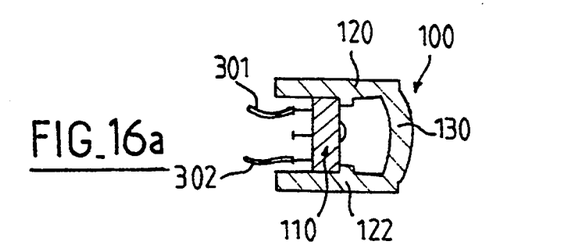
FIG. 16a is a diagrammatic view in axial vertical cross section, showing a module of light emitting diodes which are connected electrically in a first connecting arrangement.
Figures 16B, 16C:
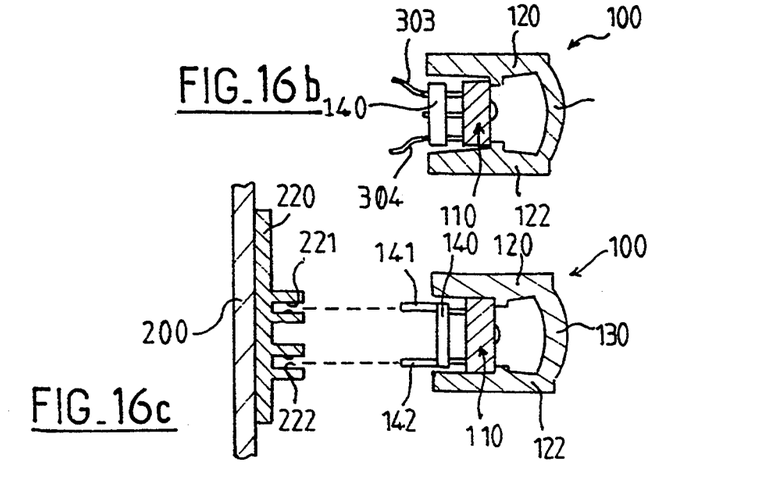
FIG. 16b is a diagrammatic view in axial vertical cross section showing a module of light emitting diodes connected electrically together in a second connecting arrangement.
FIG. 16c is a view in diagrammatic axial vertical cross section, showing a module of light emitting diodes connected together electrically in a third connecting arrangement.

Reference is now made to FIGS. 16a to 16c, which diagrammatically show other possible types of electrical connection arrangement.

In the case shown in FIG. 16a, each Brewster type diode 110 is connected individually to a supply circuit through two flexible conductors 301, 302, the ends of which may have spade terminal portions (not shown) for fitting on to the terminals of the diode.

In FIG. 16b, there is shown a printed circuit 140 which is received in a cavity of the frame 120 in a way which is more or less the same as in the case described above with reference to FIGS. 1 to 6. The printed circuit, on which N LED elements 110 are connected, is connected individually through two conductors 303 and 304 to a supply circuit.

FIG. 16c shows an arrangement which is again applicable to a printed circuit 140. However, this printed circuit has two male conductive terminals 141 and 142, which project in accurately defined positions, towards that one of its sides which is opposed to the LED elements 110. The support plate 200 itself carries female connecting elements 221 and 222, which are arranged to receive the male terminals 141 and 142 respectively. For example, these female connecting elements may form part of a circuit of the kind which may be referred to as a "cut-out circuit", which is well known for the distribution of supply voltages to filament lamps in an indicating light cluster. The cut-out circuit is indicated generally at 220 in FIG. 16c.

In such an arrangement, it should be noted that the male-female electrical connecting means may be used with advantage for the mechanical fastening of each module 100 on the support plate 200. Again, the position of the pair of male terminals 141 and 142 may vary according to the type of module concerned, so as to ensure positive identification in the same sense as before, but by the use of different technical means from those used in the arrangements described with reference to FIGS. 1 to 6.

Figure 17:
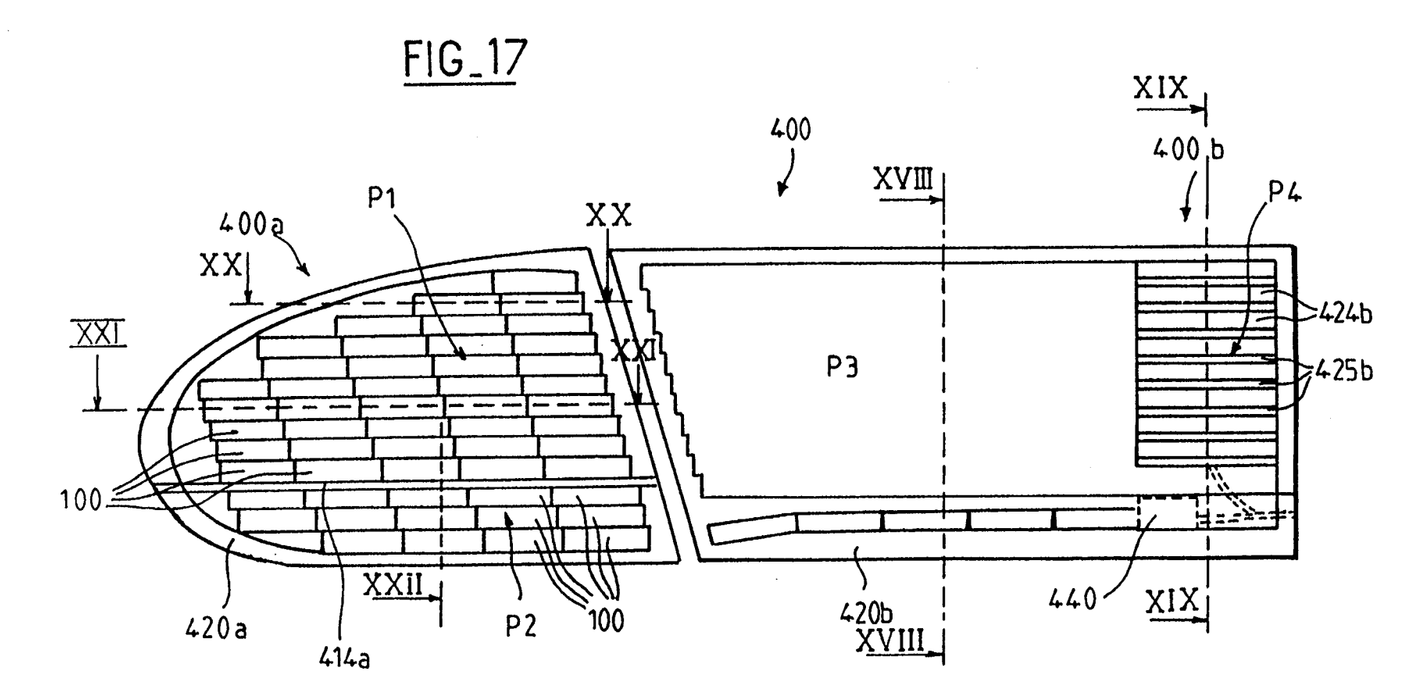
FIG. 17 is a diagrammatic front view of a rear indicator light cluster for a motor vehicle, incorporating modules of light emitting diodes in accordance with the present invention.
Figures 18, 18A:
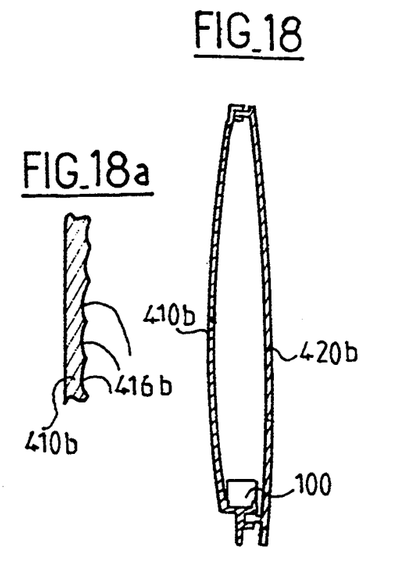
FIG. 18 is a view in cross section taken on the line XVIII—XVIII in FIG. 17.
Figure 19:
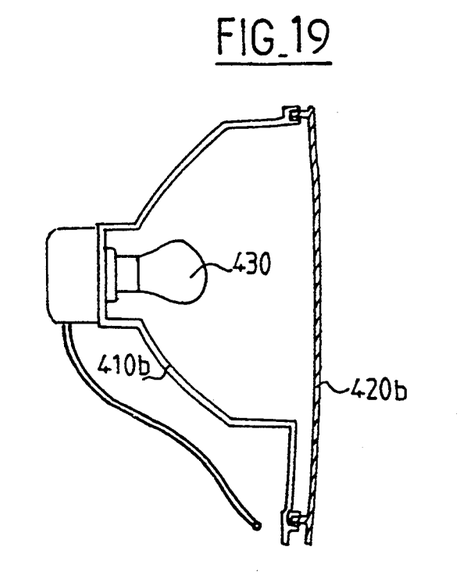
FIG. 19 is a view in cross section taken on the line XIX—XIX in FIG. 17.

Referring now to FIG. 17, this shows diagrammatically, in front view, a rear indicating light cluster for a motor vehicle using modules of light emitting diodes of the kind described above. FIGS. 18 to 22, to which reference is also now made, illustrate different transverse cross sections of this cluster. In FIGS. 17 to 22, the light cluster 400 is divided into two distinct parts, namely a curved outer part 400a, of the folded wing kind, and an inner part (i.e. disposed inwardly of the outer part towards the central plane of the vehicle). The inner part is generally flat in shape.

The outer part 400a includes a base 410a (FIGS. 20 and 21) and a curved optic or globe 420a. The distance between the base 410a and globe 420a is essentially constant. The globe 420a is mounted on the base 410a by means of a peripheral inturned flange 422a, which is engaged in a complementary groove 412a formed at the periphery of the base 410a. A sealing gasket (which is not indicated-with a reference) is, in the usual way, interposed between these two components.

The outer part 400a defines two light fields P1 and P2, which are created exclusively by means of modules 100 of light emitting diodes, which may for example be of the kinds described above. In this example, they consist of modules having four diodes 110. The base 410a of the outer part 400a of the cluster serves as the support element, like the support plate 200 described with reference to FIGS. 1 to 6, and may for example include latching means (not shown) for mounting the individual modules on it. For example, the upper light field P1 corresponds to a stop light, red in colour, while the lower field P2, which is of lesser depth, corresponds to an amber flashing direction indicating light.

Figures 20, 21, 22:
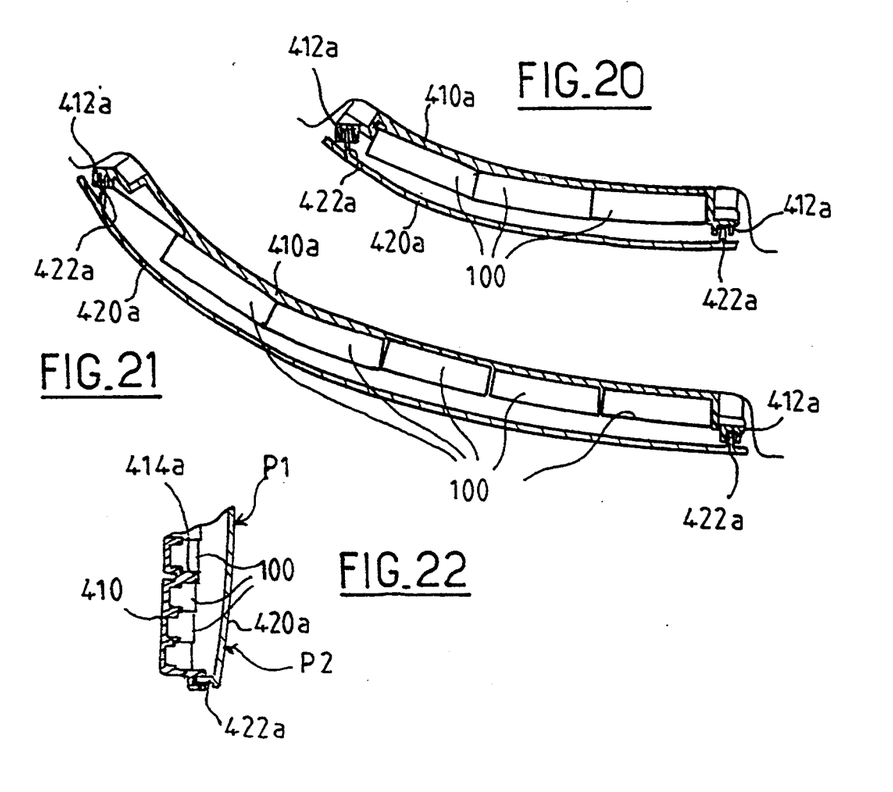
FIG. 20 is a view in cross section taken on the line XX—XX in FIG. 17.
FIG. 21 is a view in cross section taken on the line XXI—XXI in FIG. 17.
FIG. 22 is a view in cross section taken on the line XXII—XXII in FIG. 17.

It will be observed in FIGS. 20 and 21 that the different modules 100 are offset angularly from each other, which enables the rake angles described above to be provided on their end surfaces. In vertical cross section as shown in FIG. 22, the modules 100 are offset in position from each other so as to match the inclination of the base 410a and of the optic or globe 420a. The two light fields P1 and P2 are separated from each other by a narrow zone 414a formed by material integral with the base 410a, and projecting forwardly from the latter. The zone 410a is formed during moulding of the base.

Given that the colour of the light functions concerned is given directly by the light emitting diodes, the optic 420a may be made of an uncoloured transparent plastics material, or alternatively in a coloured plastic material (which may for example be smoked), in such a way as not substantially to alter the colours produced.

It will be observed that the use of modules of light emitting diodes in accordance with the invention enables indicating lights to be made with an extremely limited depth, which may typically be of 20 to 30 mm, while at the same time producing light fields with extremely homogeneous lighting levels.

The inner part 400b of the indicating light cluster 400 again has a base in a similar way to the outer part 400a. The base, 410b, of the inner part 400b is assembled in the same way with its optic 420b. The inner part 400b defines two light fields P3 and P4.

The light field P3, which may for example serve as a position light, is again provided by means of modules of light emitting diodes, but in a different way from the fields P1 and P2. More precisely, a single row consisting of several modules 100 is provided in the lower region of the cavity corresponding to the light field P3, these rows being so oriented as to emit their light upwardly. The surface of the base 410b which is directed towards the optic 420b includes particular light treatment means such as to direct outwardly, while diffusing, the light which is received from the modules 100. In the embodiment shown in FIGS. 17 to 22, this light treatment means consists of frosting. However, in a modified embodiment shown in FIG. 18a, the treatment means consists of a series of concave striations 416b (or again, convex striations) extending horizontally over the surface of the base 410b. In the light field P3, the optic 420b may for example be transparent and uncoloured or coloured (smoked). Preferably, an opaque coating, which may for example be black, is provided on the internal surface of the optic 420b at the level of the row of modules 100, in such a way as to mask the modules when the cluster is seen from outside.

The other light field P4 of the inner part 400b of the cluster corresponds for example to the reversing light or rear fog light function. In this example it is of conventional form, in which the base 410b defines, within the light field P4, a parabolic reflector which cooperates with a lamp 430 so as to form a concentrated light beam. The optic 420b in the light field P4 may have alternate zones 424b and 425b which are transparent and uncoloured, and translucent with a smoked colour, respectively, such as to present a relatively homogeneous aspect with the part of the optic corresponding to the light field P3, while at the same time not excessively attenuating the light produced.

In FIG. 17, a supply circuit for the row of modules 100 which light upwardly in the light field P3, is indicated at 440.

It is of course possible to make indicating light units, such as clusters of indicating lights, using modules of light emitting diodes in order to obtain a very wide variety of contours or shapes. In particular, by using additional modules having a single diode or two diodes, it will be understood that it is possible to follow closely any curved contours.

It is also possible to make use of "dummy modules", that is to say modules having the shape and appearance of modules such as those described above, but not having any light emitting diodes. In this way, indicating lights can be made which, when they are extinguished, have an appearance which is extremely homogeneous over a given field of large dimension, but in which the light field, or each light field, is a smaller field within the main one.

Figure 23:
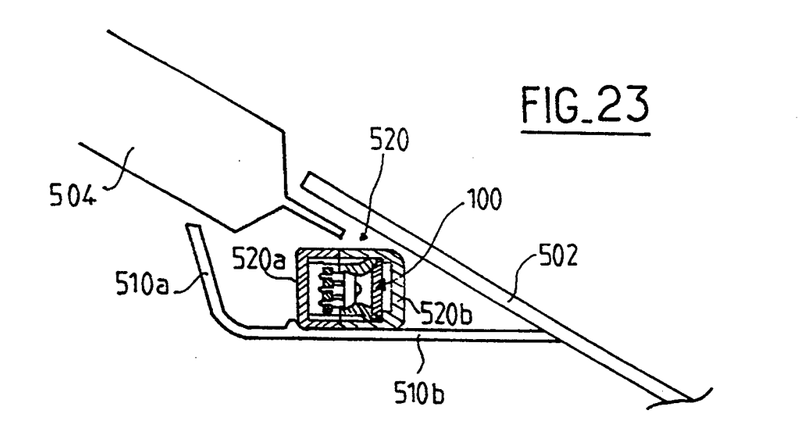
FIG. 23 is a diagrammatic general assembly drawing, showing, in transverse cross section, a raised stop light incorporating modules of light emitting diodes in accordance with the present invention.
Figure 24:
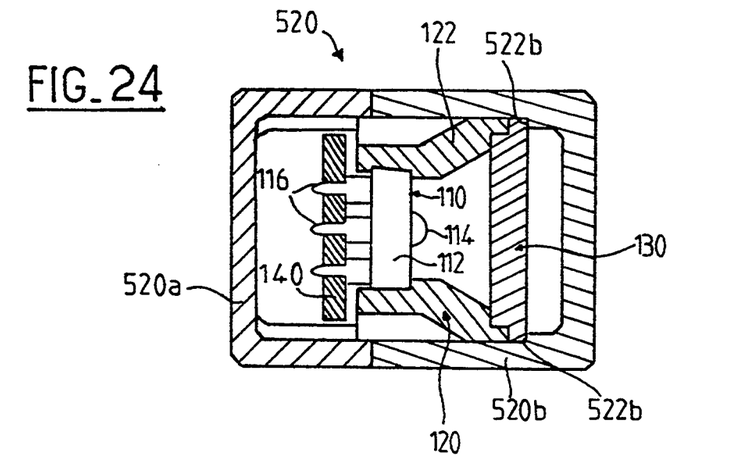
FIG. 24 is a detail view showing the light seen in FIG. 23 but in transverse cross section.
Figure 25:
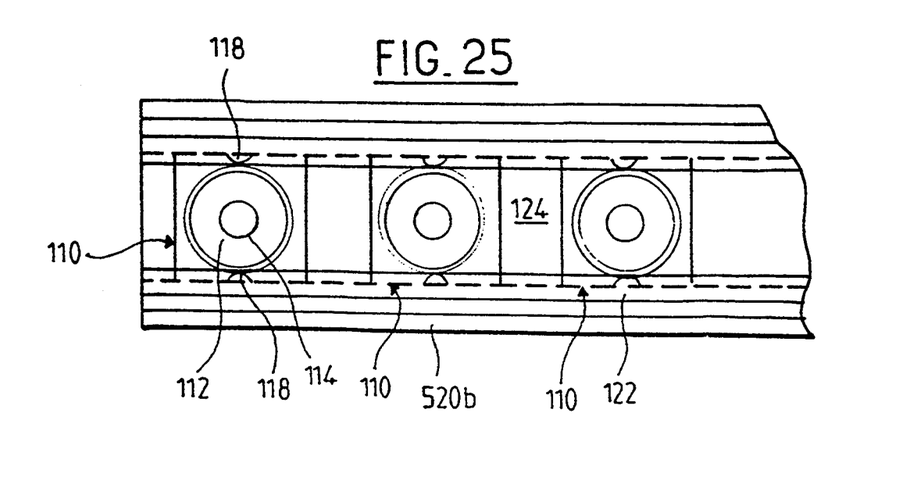
FIG. 25 is a front view of the same light as that shown in FIGS. 23 and 24.

Reference is now made to FIGS. 23 to 25 in order to describe the raised stop light (or rear window stop light), for a vehicle, which is shown therein and which is made in accordance with the invention using modules of light emitting diodes.

FIG. 23 shows the inclined rear window 502 of the vehicle, below an element 504 of the vehicle body. The raised stop light comprises a shelf 510 having a transverse cross section which is generally L-shaped, having a substantially vertical branch 510a which is abutted against the bodywork element 504, with the other, horizontal, branch 510b of the shelf being abutted against the window 502. The stop light is mounted on top of the horizontal branch 510b of the shelf.

The stop light includes a plurality of modules of the kinds described with reference to FIGS. 12 to 14, arranged in a single horizontal row. In a modification, there may be a single module of considerable length. The modules are arranged in a housing or shell 520 which extends horizontally and which consists of two half shells 520a and 520b, with the rear half shell (i.e. the one which is to the rear with respect to the direction in which light is emitted) being opaque and having means (not shown) for securing it on the horizontal branch 510b of the shelf. The forward half shell 520b (i.e. the one which is nearest to the rear of the vehicle) is made of an uncoloured (or smoked) transparent plastics material, so as to allow the light emitted by the LED elements 110 to pass through it by passing through the cover element or elements 130.

A printed circuit is received in the half shell 520a, with the connecting tags 116 of the elements 110 being soldered on to this circuit. The half shell 520a also encloses the flexible electrical connection conductors (not shown). As to the half shell 520b, this contains the modules 100, to which end it has, within the thickness of its upper and lower walls, shoulders 522b which locate the anterior edge (with respect to the direction of emission) of each module. The various components of the stop light unit (i.e. the modules 100 and shell 520) are preferably assembled together by adhesive bonding.

In this way, a raised stop light can be made having a height of only a few tens of millimeters and a width of several tens of centimeters, which is of importance both in relation to safety (vision in the rear view mirror in the cabin is to all intents and purposes unaffected), and in connection with styling. The light intensity of the light is also extremely homogeneous over its whole width.

The present invention is of course in no way limited to the various embodiments thereof which are described above and shown in the drawings. The person skilled in this technical field will be able to apply to these embodiments any variation or modification within the scope of the invention.

What is claimed is:

1. An indicating light unit for a motor vehicle comprising: a support plate; an optic extending along the said support plate; a plurality of elementary luminous modules arranged between the said support plate and optic, wherein each said module comprises: a frame; a plurality of light emitting diodes carried on the said frame; a cover element covering the said diodes, and first electrical connection means interconnecting the said diodes, the unit further comprising: fastening means securing the said modules in juxtaposed relationship with each other, in predetermined positions defined on the said support plate: and second electrical connection means for connecting the said luminous modules to a common electrical supply source.

2. An indicating light unit according to claim 1, wherein the said cover element of each module includes optical means for diversion of the light emitted by the module.

3. An indicating light unit according to claim 1, wherein each of at least some of the said modules has a rectangular contour and includes a plurality of the said light emitting diodes aligned with each other to define a longitudinal axis, the said first electrical connection means connecting these diodes electrically in series.

4. An indicating light unit according to claim 1, wherein the said support plate comprises a base wall of the light unit, the said fastening means comprising cooperating latching elements carried by the said base and said modules.

5. An indicating light unit according to claim 3, wherein the said support plate comprises a base wall of the light unit, the said fastening means comprising cooperating latching elements carried by the said base and said modules, and wherein the frame of each module has side walls defining, on either side of each diode, a plurality of assembly zones, each having a different configuration selected from the group comprising an open configuration, a closed configuration, and a latching configuration.

6. A module according to claim 5, defining a pattern of said assembly configurations associated in one-to-one relationship with at least one characteristic of the module selected from the group comprising light colour characteristics and optical treatment characteristics, the said cover element or elements being adapted to perform light treatment defining the said characteristics thereof.

7. An indicating light unit according to claim 5, wherein each module defines a latching configuration which itself includes a cavity, the said fastening means comprising at least two flexible lugs in predetermined positions on the said support plate for engagement with corresponding said modules, with each said flexible lug having a tooth engaging in a said cavity of the corresponding module.

8. An indicating light unit according to claim 7, wherein a first module has a first attachment zone defining the said latching configuration and a second module has an atachment zone defining an open configuration which includes a passage, with the said first and second modules being disposed on the support plate in side-by-side relationship, the said passage of the second module being so oriented that the said flexible lug extends at least partially into the said passage, whereby to ensure that each module can be positioned on the support plate in only the correct position and orientation.

9. An indicating light unit according to claim 4, defining a first region and a second region, the said modules comprising at least one elementary module of a first type and at least one elementary module of a second type, the said fastening means comprising first fastening means in the first region for securing the modules of the first type and second fastening means in the second region for securing the modules of the second type, the first and second fastening means defining different geometries from each other.

10. A module according to claim 1, wherein the said frame of each module has at least one face in the group comprising terminal and side faces thereof, defining a rake angle whereby a plurality of modules can be juxtaposed with each other with an alignment error on a non-flat support plate.

11. An indicating light unit according to claim 1, comprising a base extending behind the said optic, with the support plate being generally transverse to the said base and optic in a peripheral region of the light unit, the said fastening means securing the luminous modules on the support plate in an orientation such that light is emitted by the modules in a general direction which is slightly inclined with respect to the base, the latter having a surface facing towards the optic and having optical means for redirecting the light received from the light emitting diodes towards the optic.

12. An indicating light unit according to claim 11, wherein the said optical means on the surface of the base comprise frosting of the latter.

13. An indicating light unit according to claim 11, wherein the said optical means on the surface of the base comprise striation of the latter.

14. An indicating light unit according to claim 11, having a single row of said modules, of elongate form and disposed in succession, the optic and the said base of the unit together defining a cavity having a lower region, with the said row of modules being situated in the said lower region.

15. An indicating light unit according to claim 11, further including an opaque masking coating on the said optic in line with the modules.

16. An indicating light unit according to claim 1 having an elongate housing comprising a first half shell having a generally U-shaped cross section and constituting the said support plate, the first half shell having a transverse branch defining the said optic, with the first half shell defining engagement surfaces within it, a single row of elongate luminous modules being disposed within the first half shell against the said engagement surfaces.

17. An indicating light unit according to claim 16, wherein the housing is closed and includes a second half shell arranged behind the said row of modules.

18. An indicating light unit according to claim 16, wherein the said row of modules and the said housing are oriented horizontally, the light unit further including means for mounting it along a horizontal edge of a vehicle rear window.

19. An indicating light unit according to claim 1, wherein each said module further includes a printed circuit, with the said light emitting diodes having electrical connecting tags soldered on the said printed circuit, the latter having first electrical terminal elements, the said support plate having second electrical terminal elements for cooperating with the said first terminal elements whereby to provide electrical connection between the modules and an electrical supply source.

20. An indicating light unit according to claim 1, further including non-luminous elementary modules having the same appearance as extinguished luminous modules, whereby the light unit can present a light field in a smaller zone than the zone defined by the external contours of the light unit.

21. A cluster of indicating light units comprising at least one indicating light unit according to claim 1.

* * * * *

UNITED STATES PATENT AND TRADEMARK OFFICE
CERTIFICATE OF CORRECTION

PATENT NO.   : 5,436,809
DATED        : July 25, 1995
INVENTOR(S)  : Marc Brassier et al It is certified that error appears in the above-indentified patent and that said Letters Patent is hereby corrected as shown below:

In Column 10, Claim 1, at line 68, after the word "plate" delete ":" and insert therefor ";".

Signed and Sealed this

Seventeenth Day of October, 1995

Attest:

BRUCE LEHMAN

Attesting Officer        Commissioner of Patents and Trademarks